United States Patent [19]

Weiss

[11] 4,400,736
[45] Aug. 23, 1983

[54] LID RAISING MEANS FOR A JACK-IN-THE-BOX PROJECTION TELEVISION RECEIVER

[75] Inventor: Gary R. Weiss, Highland Park, Ill.

[73] Assignee: Zenith Radio Corporation, Glenview, Ill.

[21] Appl. No.: 277,493

[22] Filed: Jun. 26, 1981

[51] Int. Cl.³ .............................................. H04N 5/64
[52] U.S. Cl. .................................. 358/254; 358/237; 312/7.2
[58] Field of Search ................ 358/237, 254, 60, 231, 358/255; 312/7.2

[56] References Cited

U.S. PATENT DOCUMENTS

| 2,404,943 | 7/1946 | Beshgetoor | 358/254 |
| 2,476,494 | 7/1949 | Jones et al. | 358/254 |
| 4,349,845 | 9/1982 | Strauss | 358/237 |
| 4,358,792 | 11/1982 | Domoleczny | 358/237 |

Primary Examiner—Michael A. Masinick

[57] ABSTRACT

A lid-raising device is disclosed for use in an ultra-compact, jack-in-the-box television receiver housed in an open-topped cabinet. The cabinet has a lid pivotally attached at the back thereof for selectively opening and closing the cabinet for emergence and storage of a unitary optical assembly elevatable from and nestable within the cabinet by a precision elevating device, and includes a rear-projection screen for displaying a television image upon its emergence. The unitary optical assembly includes a rigid, box-like shroud having a slanted back and an open front for receiving and supporting the screen. The lid-raising device comprises an assembly of at least one cam element and a captivated cam-follower element for slidably attaching the lid to the shroud such that as the unitary optical assembly is elevated and lowered by the precision elevating device, the lid-raising device is effective to raise and lower the lid in relatively friction-free sliding association while holding the lid apart from rubbing contact with the shroud.

3 Claims, 15 Drawing Figures

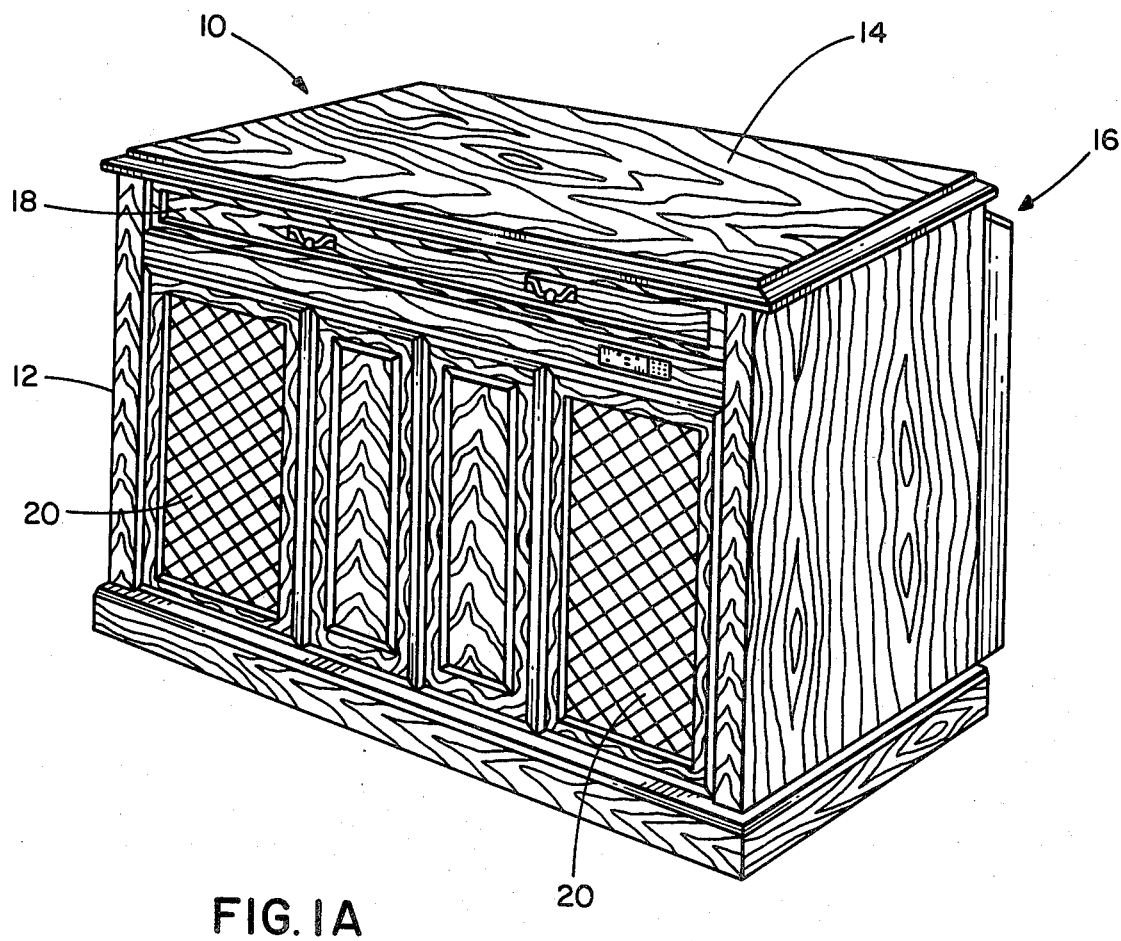
FIG. IA

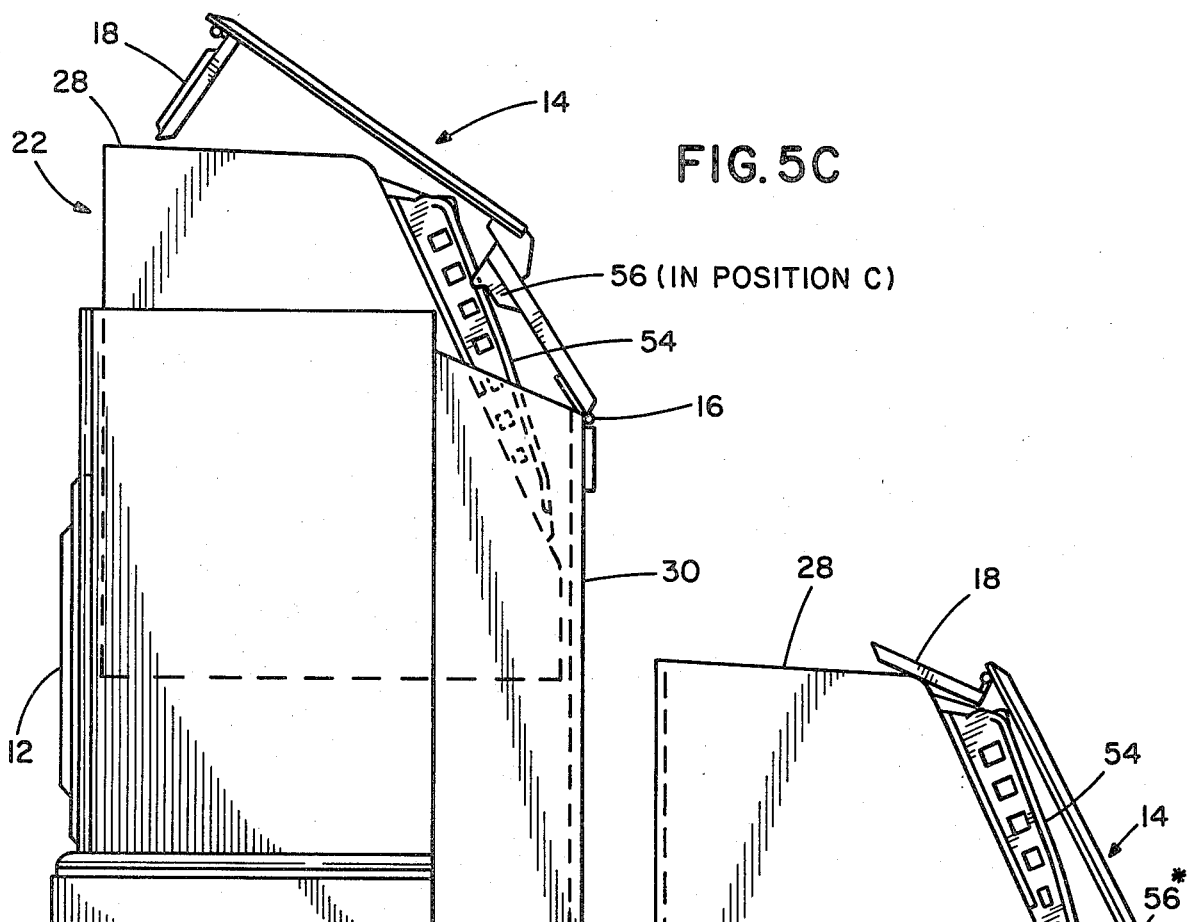
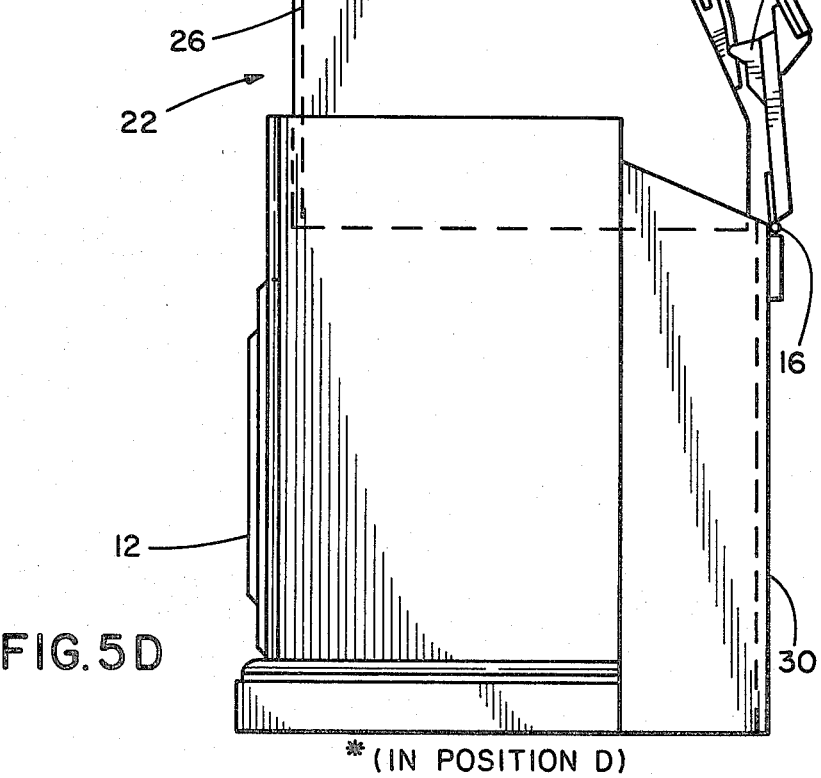

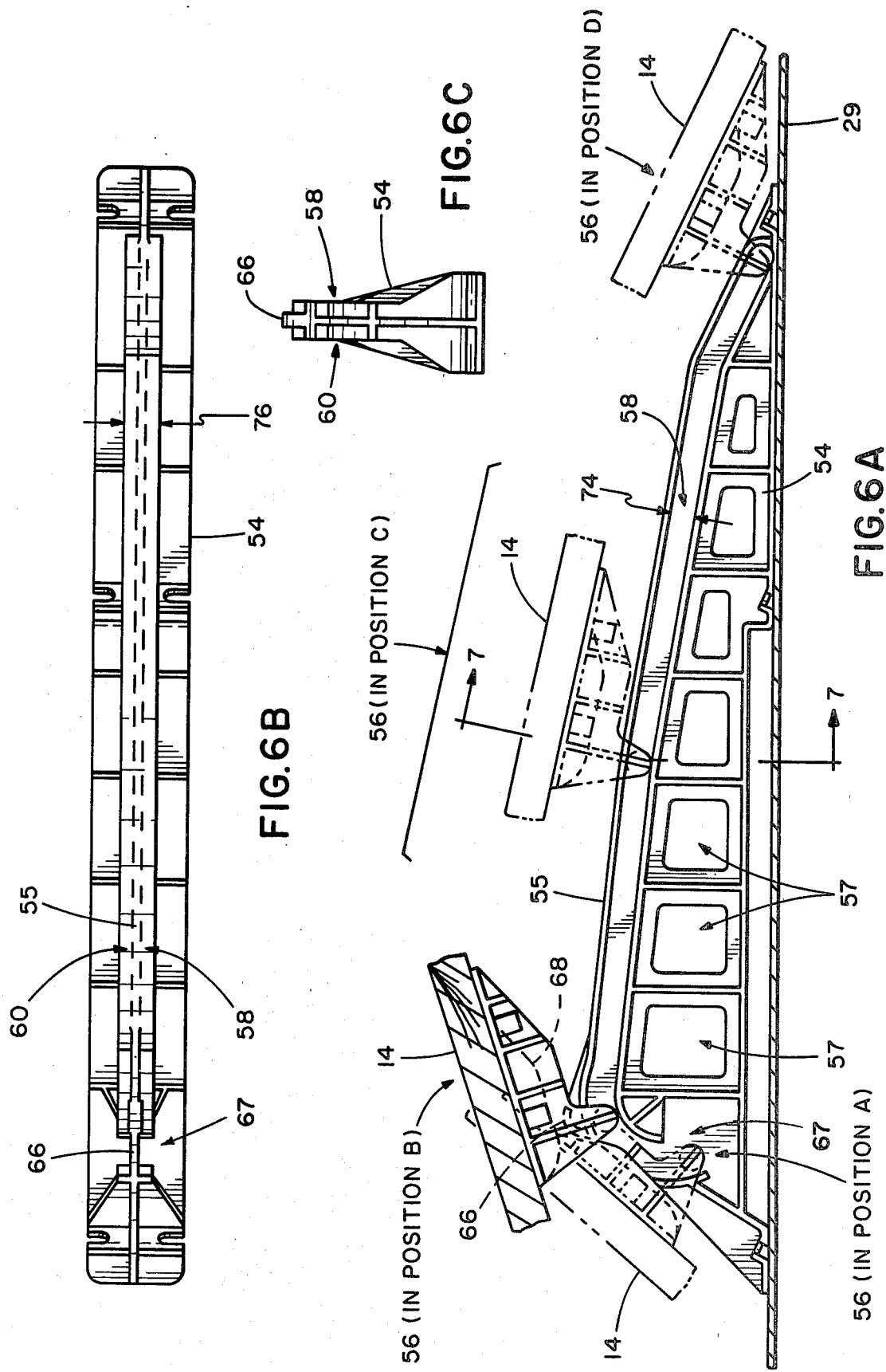

LID RAISING MEANS FOR A JACK-IN-THE-BOX PROJECTION TELEVISION RECEIVER

CROSS-REFERENCE TO RELATED APPLICATIONS

This application is related to but in no way dependent upon copending applications of common ownership herewith including: Ser. No. 228,434 filed Jan. 26, 1981; U.S. Pat. No. 4,349,845; Ser. No. 238,861 filed Feb. 27, 1981; Ser. No. 235,059 filed Feb. 17, 1981, now U.S. Pat. No. 4,358,792.

BACKGROUND OF THE INVENTION AND PRIOR ART DISCLOSURES

This invention concerns television systems, and is particularly directed to a system in which a rear projection screen, storable in the system cabinet, is elevatable for viewing.

A system of this type is described and fully claimed in referent copending application Ser. No. 228,434. A jack-in-the-box projection television receiver comprises cabinet means for enclosing the components of the receiver, and includes lid means hinged at the back of the cabinet. The receiver comprises vertically arranged, elevatable rear projection screen means selectively storable in the cabinet. Image source means provides for forming a television image. Stationary projection means provide for projecting an aerial image of a television image formed by the image source means along a folded optical path onto the screen means when the optical path is erected and the screen means is located a predetermined image projection distance from the source means. The receiver further includes means for elevating the screen from a first receiver-inoperable position wherein the screen means is completely enclosed within the cabinet and the receiver is ultra-compact, to an elevated receiver-operable position wherein the screen means is emerged from the cabinet. As a result, the optical path is extended to a length equal to the predetermined image projection distance whereby the projection image is coincident with the screen.

OBJECTS OF THE INVENTION

It is a general object of this invention to provide means for lifting and lowering the lid of a cabinet of a projection television receiver wherein a viewing screen is elevated from the cabinet for viewing.

It is a more specific object of this invention to provide means for lifting and lowering the lid of the ultra-compact, jack-in-the-box projection television receiver described and claimed in referent copending application Ser. No. 228,434.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIGS. 1A and 1B are oblique views in perspective of a projection television receiver according to the invention described and claimed in referent copending application Ser. No. 228,434. There is depicted, respectively, a first, receiver-inoperable position; and a second, receiver-operable position wherein a component including a rear projection screen is elevated from the receiver cabinet for viewing;

FIGS. 5A–5D are a series of views showing a sequence of the positions of associated elements of cabinet and lid raising components during lid raising and lowering;

FIG. 6A is a side view in elevation of a preferred embodiment of a cam element according to the invention and indicating the excursive path of an associated cam-follower element during a lid-raising or -closing cycle; FIGS. 6B and 6C comprise a plan view and an end view in elevation, respectively, of the cam element depicted by FIG. 6A;

DESCRIPTION OF THE PREFERRED EMBODIMENT

Figure 1B:
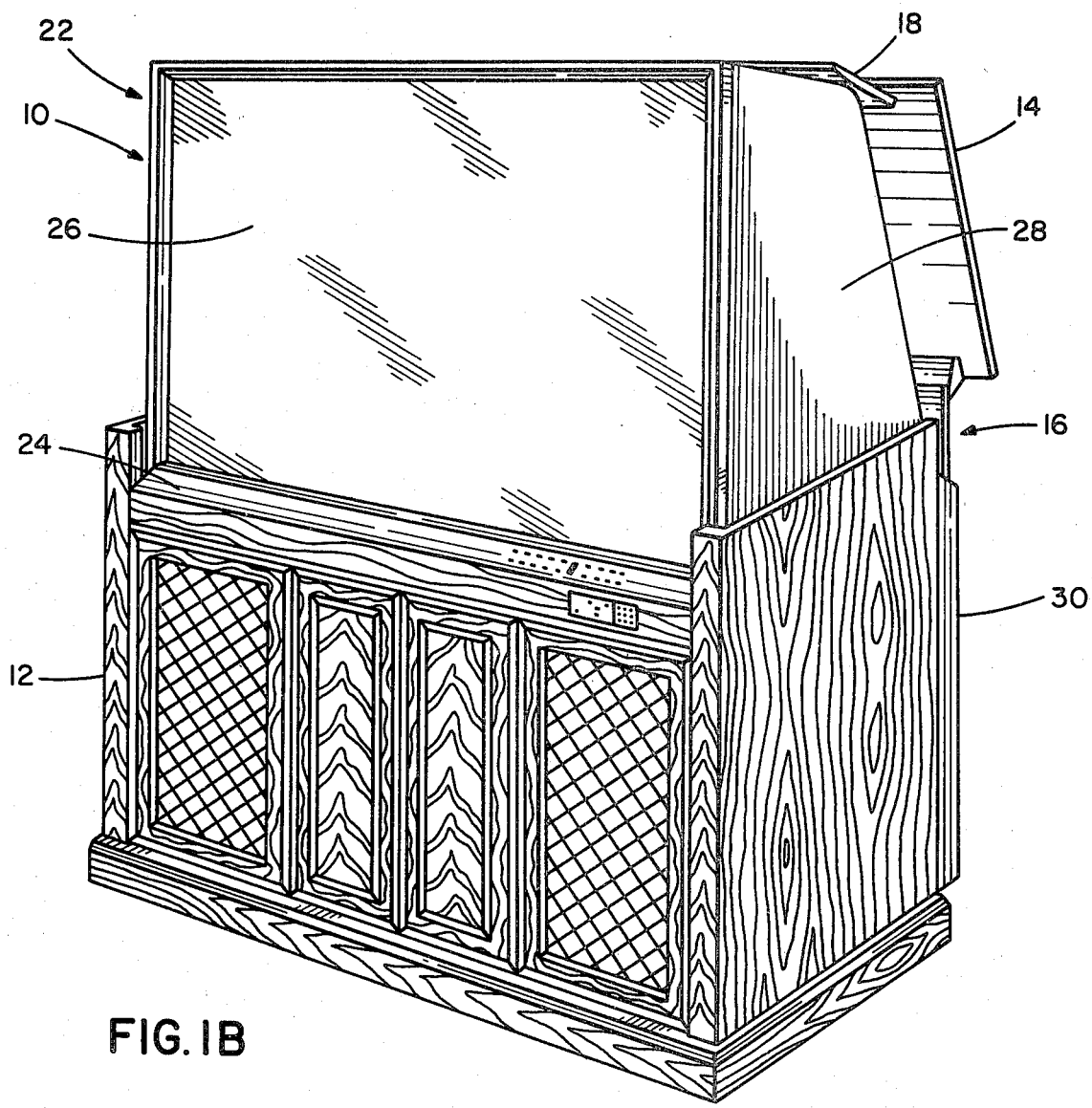

An ultra-compact jack-in-the-box projection television receiver 10 according to the invention disclosed in referent copending application Ser. No. 228,434 is shown by FIG. 1A. The receiver comprises open-topped cabinet means 12 for housing the components of the receiver. Cabinet 12 has lid means 14 pivotally attached at the back of the cabinet; the pivot may consist of at least one hinge 16 which may comprise a piano hinge, for example. The lid 14 is depicted as having an overhanging control panel 18 for covering a receiver control panel. Grilled aperture ports 20 provide for audio emission from concealed speakers of a stereo sound system, for example.

With reference now to FIG. 1B, lid 14 is shown as being raised and a unitary optical assembly means 22 is shown as being emerged from cabinet means 12. Control panel 24, which may include all standard television receiver front panel controls such as controls for channel selection, audio volume, and various chromatic controls, is exposed by the raising of control panel cover means 18 when lid 14 is raised by means as will be described. Control panel cover 18 is shown as being hingedly dependent from lid 14, as indicated. Control panel cover means 18 is described and claimed in referent copending U.S. Pat. No. 4,349,845.

Figure 2:
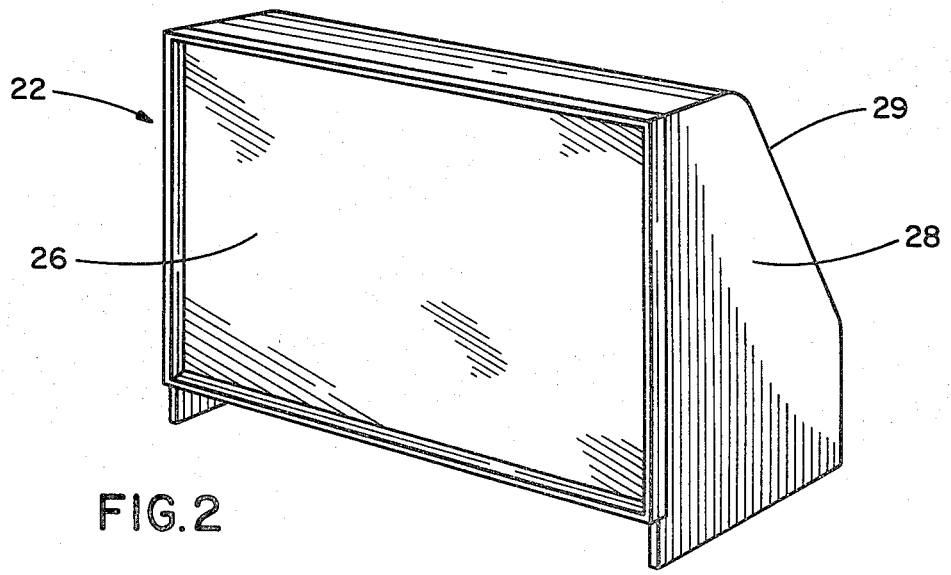
FIG. 2 is a detail view in perspective of a unitary optical assembly component elevatable from the receiver cabinet shown by FIGS. 1A and 1B.

Unitary optical assembly means 22 is selectively storable in cabinet 12, and elevatable therefrom. Lid 14 provides for selectively opening and closing cabinet 12 for emergence and storage of unitary optical assembly 22. The unitary optical assembly 22 includes rear projection screen means 26 for displaying upon emergence a television image projected by receiver 10. The unitary optical assembly 22 (see FIG. 2) further includes rigid, box-like shroud means 28, which has an open front for receiving and supporting screen 26, as depicted. Shroud 28 has a slanted back section 29 as shown and has closed sides and a closed top. Shroud 28 is preferably made of high-impact polystyrene formed in a pressure mold. The material is essentially a "structural foam" that provides strength and rigidity with light weight. The raw color as molded is preferably dark chocolate brown having minimum light reflectivity.

The unitary optical assembly 22 provides, by means of shroud 28, for maintaining screen 26 in a predetermined fixed relationship with internal projection optical components of receiver 10 (not shown) when screen 26 is elevated from cabinet 12. The unitary optical assembly is fully described and claimed in referent copending application Ser. No. 238,861. Cabinet extension 30 provides additional space for enclosing shroud 28 when elevatable assembly 22 is stored.

Unitary optical assembly 22 is elevatable from and nestable within cabinet 12 by precision elevating means. The precision elevating means also provides for opening and closing cabinet 12 by raising or lowering lid 14 for emergence and storage of the unitary optical assembly, as will be shown.

Figure 3:
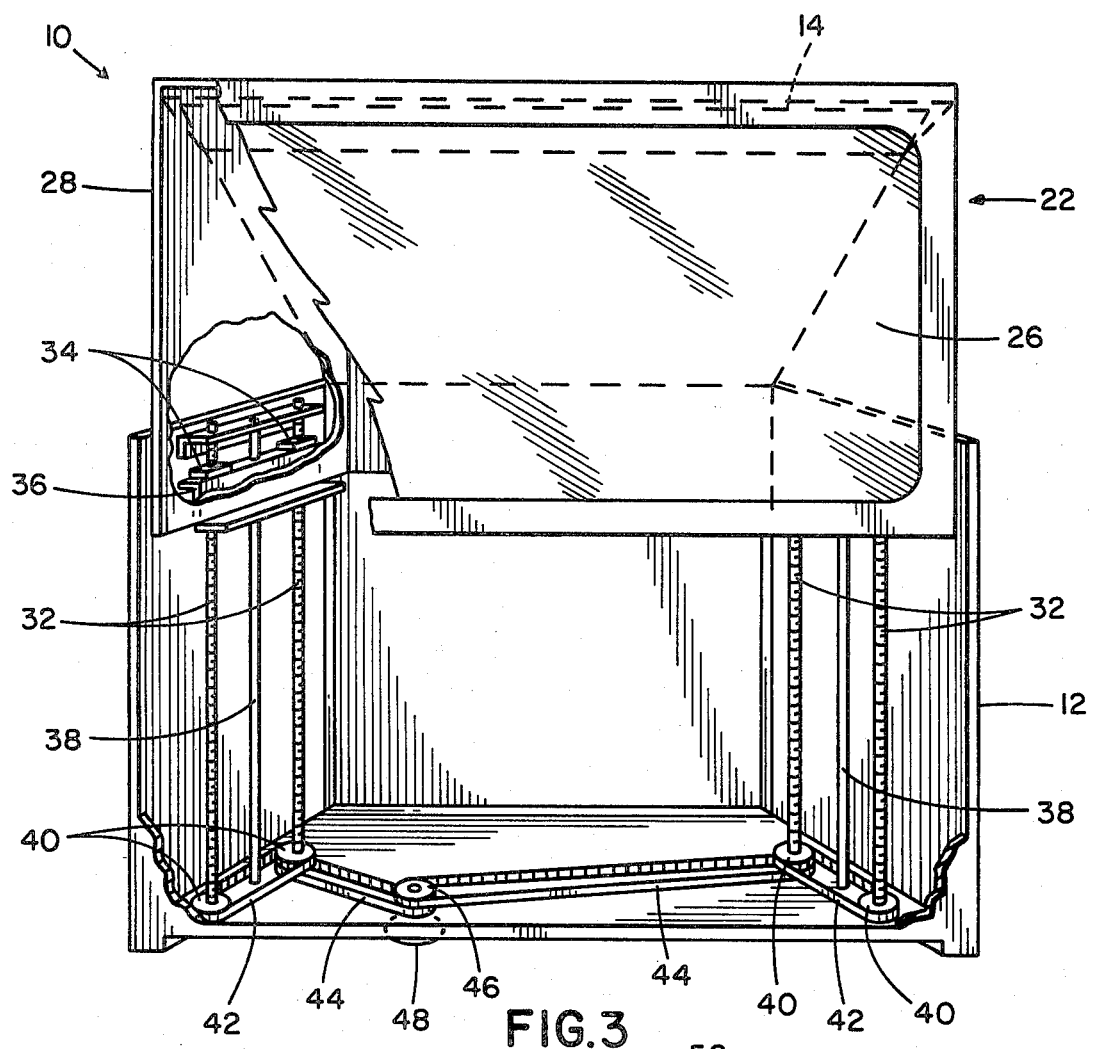
FIG. 3 is a perspective view of the receiver with the cabinet front and screen cut away to show details of the means for elevating and lowering the unitary optical assembly.

FIG. 3 depicts means for elevating unitary optical assembly 22 from a first, receiver-inoperable position wherein screen 26 is stored in cabinet 12, to a second receiver-operable position wherein screen 26 is emerged from cabinet 12. Four vertically oriented and vertically stabilized screw means 32, for example, are shown as providing for elevating and lowering screen 26. Shroud 28 is shown as cut away in the left-hand side of FIG. 3 to show details of the elevating means; an identical mirror image assembly is located on the opposite side of the cabinet 12, but partially obscured by screen 26, as depicted.

The rotation of screw means 32 is translated into vertical movement by screw follower means 34 attached to bracket 36, to which shroud 28 is in turn attached. Guide rods 38 provide for vertically stabilizing shroud 28 in its vertical traverse. Screen 26 is depicted as being in its raised position.

Screw means 32 are caused to rotate in unison by power train means indicated as comprising screw means drive pulleys 40 which are caused to rotate in unison by drive pulley link belts 42. Drive pulleys 40 are in turn linked by belts 44 to drive pulleys 46 which are rotated by a reversible electrical motor 48. Belts 42 and 44 are depicted as being of the synchronous type for mating with synchronous pulleys 40 and 46, providing positive drive. The precision elevating means are fully described and claimed in the referent copending application Ser. No. 235,059 now U.S. Pat. No. 4,358,792.

Figure 4:
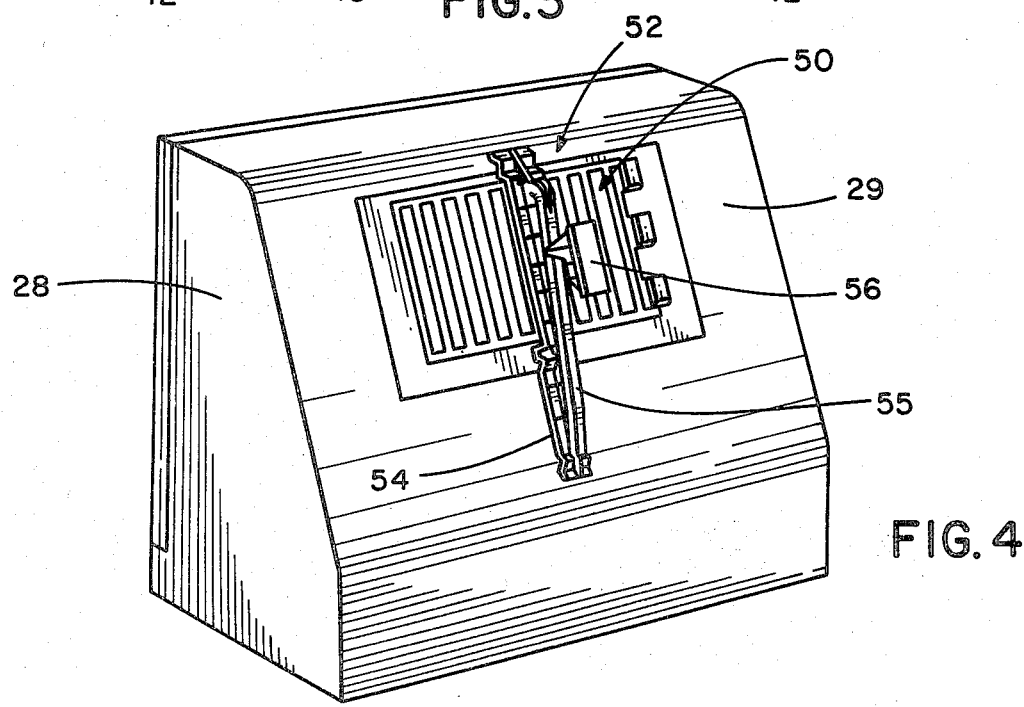
FIG. 4 is a rear view in perspective of the component elevatable from the cabinet shown by FIG. 2, and depicting a cam and cam-follower assembly according to the invention attached thereto for use in raising and lowering the cabinet lid.

The elevating of the unitary optical assembly 22 and associated screen 26 from a stored, first receiver-inoperable position wherein screen 26 is emerged from cabinet 12, results in a large influx of air into cabinet 12, and when unitary optical assembly 22 is lowered for storing, a large efflux of air. To provide for the unimpeded influx and efflux of air, a capacious vent 50 is provided in the slanted back 29 of shroud 28, as depicted in FIG. 4. A spun-glass filter (not shown) inhibits entrance of contaminants.

FIG. 4 also depicts lid-raising means 52 according to a preferred embodiment of the invention which, in conjunction with the precision elevating means described supra, provides for raising and lowering lid 14 to selectively open and close cabinet 12. Lid-raising means 52 preferably comprises an assembly of at least one cam element 54 including a track 55 shown as being attached to shroud 28, and a captivated cam-follower 56, which in this embodiment provides for attachment to lid 14 (not shown in FIG. 4). The lid-raising means according to the invention provides for slidably attaching lid 14 to shroud 28 such that, as the unitary optical assembly 22 is elevated and lowered by the precision elevating means, the lid-raising means 52 is effective to raise and lower lid 14, while holding lid 14 apart from rubbing contact with shroud 28.

FIGS. 5A–5D comprise a series of views showing a sequence of the relationships of the associated elements of cabinet 12 and lid-raising elements according to the invention as the lid 14 is raised or lowered. With specific reference to FIG. 5A, lid 14 will be noted as being in two sections—a first section 14A for covering the open top of cabinet 12, and a second section 14B extending at an angle from first section 14A and permanently attached thereto, as depicted. Second section 14B provides for covering cabinet extension 30, and is shown as being pivotally attached to cabinet extension 30 by hinge 16. Cam-follower element 56 is attached to second section 14B, as depicted.

Figure 5A:
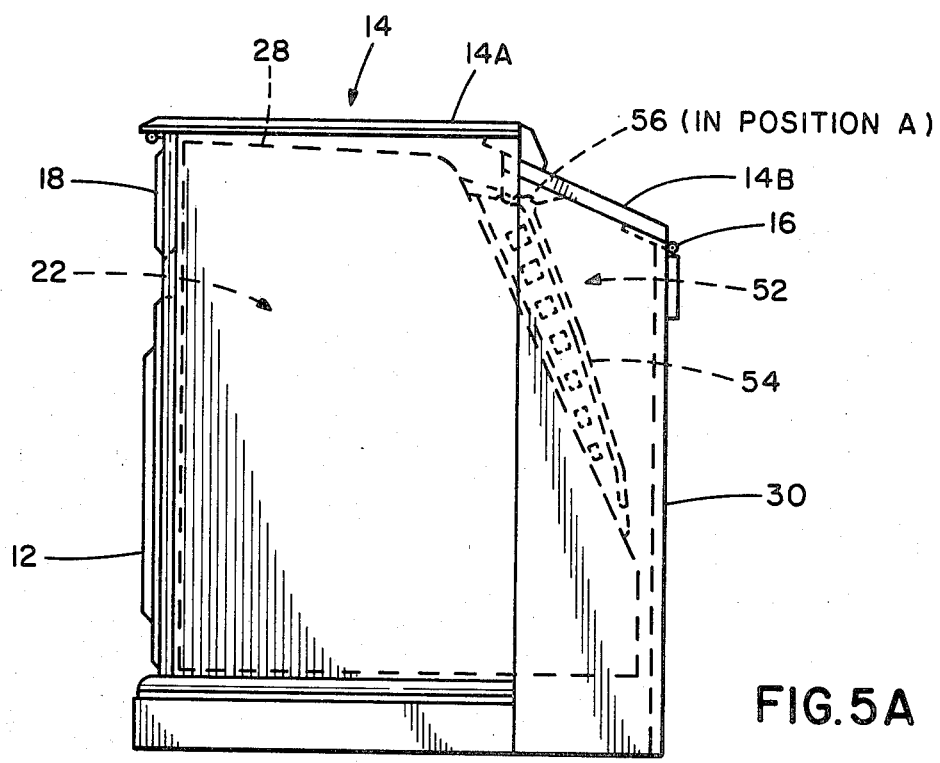
Figure 5B:
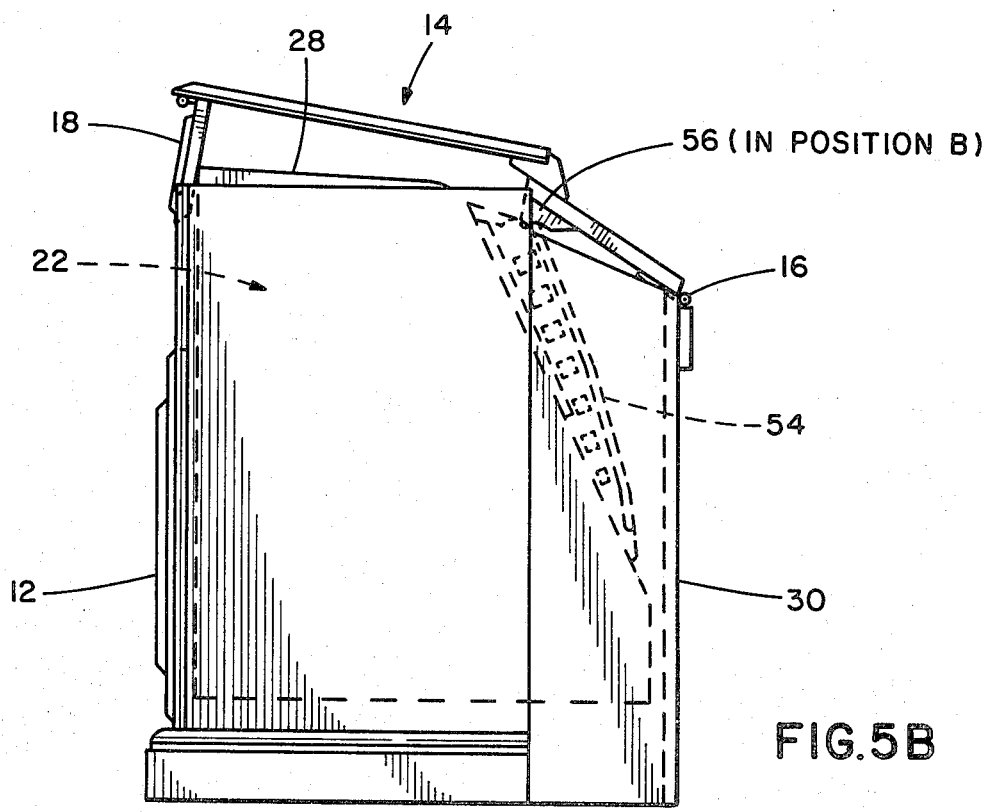
Figure 7:
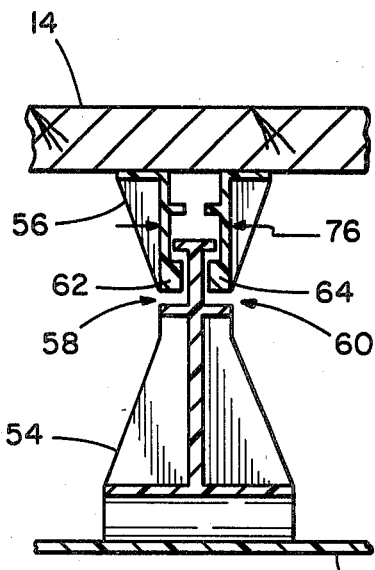
FIG. 7 is an end view of the cam and cam-follower assembly depicted in FIG. 6A, showing additional details in a cross-section taken along lines 7—7 of FIG. 6A.

In FIG. 5A, cam-follower element 56 is depicted as being in Position A with respect to cam element 54; in this Position A, unitary optical assembly 22 is nested in cabinet 12 and lid 14 is closed. FIG. 5B depicts Position B of the lid raising means according to the invention in response to the activation of the precision elevating means described supra; it will be noted that although cam-follower element 56 has travelled a relatively short distance with respect to cam element 54, there has been an initial quick rise of lid 14, the reason for which will be explained.

FIG. 5C depicts Position C of cam-follower element 56 wherein element 56 is well along in its excursive path along cam element 54, with the result that lid 14 is open about half-way. Final Position D, wherein the cam-follower element 56 is shown as being at the end of its excursion, and wherein the lid 14 is fully open, is shown by FIG. 5D. Unitary optical assembly 22 is shown as being fully emerged from cabinet 12, and the rear-projection screen 26 is in position to display a television image projected by internal optical components (not shown).

FIGS. 6A–6C and FIG. 7 depict the preferred embodiments of cam element 54 and cam-follower element 56, and show in detail the relationships of elements 54 and 56 in Positions A–D. Cam element 54, shown in elevation in FIG. 6A, is indicated as comprising a track 55 medially attached to the slanting back 29 of shroud 28, and having longitudinally oriented oppositely facing groove cams 58 and 60 for captivating inwardly facing grove-cam-follower members 62 and 64 of cam-follower element 56. A series of cut-out sections 57 in cam element 54 provide for lightness, and the truss-like construction depicted provides strength. Cam element 54 is indicated as being attached in this embodiment of the invention to the slanted back 29 shroud 28, and cam-follower element 56 as being attached to lid 14. By captivating track-travelling cam-follower element 56 as shown, the lid-raising means according to the invention is effective to retain lid 14 in predetermined spaced association to shroud 28. By this means, there is no possibility of lid 14 opening farther than the desired fully open position D, shown by FIG. 5D. Otherwise, it would be possible for lid 14 to fall backwards due to accidental contact or other undesired impetus.

Figure 8:
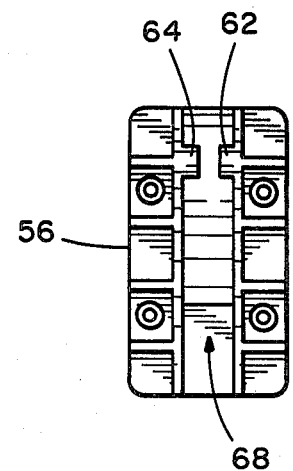
FIG. 8 is a plan view of the cam-follower element depicted in FIG. 7, showing additional construction details.

The initial quick rise of lid 14 according to the invention is attained during Position B depicted by FIG. 5B. With reference also to FIG. 6A wherein the associated cam elements are also depicted in Position B, the quick-rising force is applied to the cam-follower element 56 by upstanding spur 66, depicted as projecting steeply upwardly from the track 55 of cam element 54. As the lid is raised by the precision elevating means as described, spur 66 comes into contact with the floor 68 of cam-follower element 56, nudging cam-follower element 56 sharply upwardly, and providing the desired initial abrupt rise. The floor 68 of cam-follower element 56 is also shown in a plan view in FIG. 8. As the lid 14 continues to rise, floor 68 of cam-follower element 56 continues to ride on spur 66 to the point where spur 66 blends into the top counter of track 55 of cam element 54, as depicted. Cam-follower members 62 and 64 thereafter provide for the lid-raising excursion of cam-follower element 56 by following respective groove cams 58 and 60.

The gap 67 in the track 55 provides for quick disengagement of cam-follower element 56 from cam element 54. This feature simplifies removal of lid 14 for servicing of components within the cabinet 12.

Figure 9:
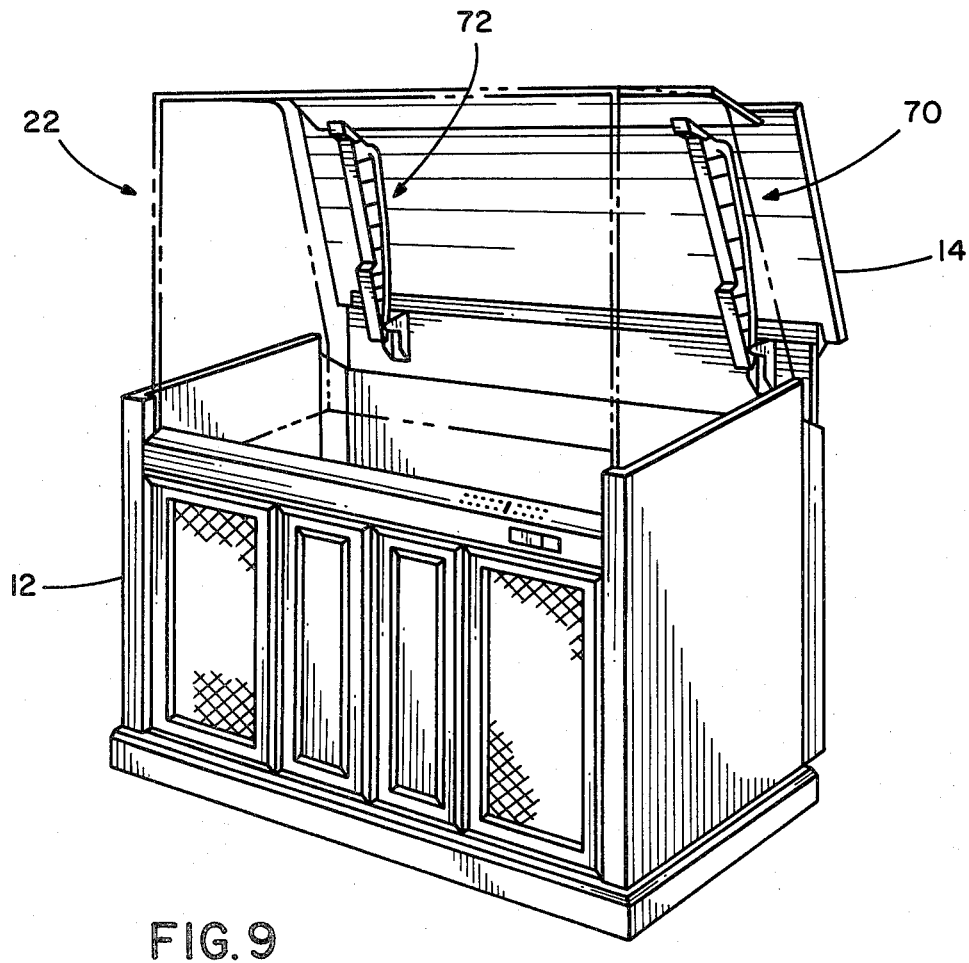
FIG. 9 shows another embodiment of the invention wherein two lid-raising means according to the invention are utilized.

The lid-raising means 52 according to the invention is not limited to one medially-located assembly, as has been depicted. As shown by FIG. 9, two lid-raising means 70 and 72 may be used, each spacedly located adjacent to the edge of lid means 14, as depicted. The use of two such lid-raising means can be efficaceous in applications in which the attached parts such as the lid and shroud are, for example, relatively large and heavy.

To provide relatively friction-free operation, cam element 54 and cam-follower element 56 are preferably molded from dissimilar plastics. For example, the cam element 54 may be molded from nylon, and cam-follower element 56 from Delrin (R). By the use of such materials, lubricants are not required and relatively long, friction-free operation is assured. Cam element 54 may be attached to shroud 28 by a suitable adhesive. Cam-follower element 56 may be attached to the lid 14 by wood screws means.

Exemplary dimensional heighth (H), width (W) and depth (D) values of the cabinet 12 of the projection television receiver, and components of the preferred embodiment of the invention described heretofore, are listed as follows. Reference numbers are in parentheses. It is to be recognized that the values are by way of example only, and are intended to be in no way limiting. The dimensional values and approximations are in inches, unless otherwise noted.

Cabinet (12)
   Screen stored: 31H×44W×19.5D
   Height, screen elevated: 58
   Cabinet Extension (30) 26.5H×42W×8.5D
Lid (14)
   First section (14A): 44W×20D
   Second section (14B): 38W×7.5D
Control Panel Cover (18)
   6H×38W
Shroud (28)
   28.7H×37.6W
   Depth, at bottom: 23.1
   Depth, at top: 17.5
   Angle of slanted back section (29), with respect to vertical: 30 degrees
   Length of slanted back section (29): 23.3
Cam Element (54) (See FIGS. 6A, 6B and 7.)
   3.8H×2.0W×21.5L
   Height of each groove cam (58 and 60)
      Ref. No. 74: 0.5
   Width of track, Ref. No. 76: 0.7
   Height of spur (66) above track: 0.31
   Length of track (55): 18.7
Cam-follower Element (56)
   1.9H×2.6W×4.6L While particular embodiments of the invention have been shown and described, changes and modifications may be made without departing from the invention in its broader aspects, and therefore, the aim of the appended claims is to cover all such changes and modifications as fall within the true spirit and scope of the invention.

I claim:

1. Lid-raising means for use in an ultra-compact, jack-in-the-box, rear-projection television receiver housed in an open-topped cabinet having lid means pivotally attached at the back thereof for selectively opening and closing said cabinet for emergence and storage of a unitary optical assembly elevatable from and nestable within said cabinet by precision elevating means, said unitary optical assembly including rear-projection screen means for displaying a television image upon said emergence, said unitary optical assembly including rigid, box-like shroud means having an open front for receiving and supporting said screen means, said lid-raising means comprising a cam assembly including at least one cam element and one captivated cam-follower element for slidably attaching said lid means to said shroud means such that as said unitary optical assembly is elevated and lowered by said precision elevating means, said lid-raising means is effective to raise and lower said lid in relatively friction-free sliding association while holding said lid means apart from rubbing contact with said shroud means.

2. The lid-raising means defined by claim 1 wherein said lid raising means comprises two of said cam assemblies each spacedly located adjacent to an edge of said lid means.

3. Lid-raising means for use in an ultra-compact, jack-in-the-box rear-projection television receiver housed in an open-topped cabinet having lid means pivotally attached at the back thereof for selectively opening and closing said cabinet for emergence and storage of a unitary optical assembly elevatable from and nestable within said cabinet by precision elevating means, said unitary optical assembly including rear-projection screen means for viewing a television image upon said emergence, said unitary optical assembly including rigid, box-like shroud means having a slanted back, closed sides and closed top and an open front for receiving and supporting said screen means, said lid-raising means comprising a cam assembly for slidably attaching said lid means to said shroud means, said cam assembly including a track medially attached to said slanting back of said shroud means and having longitudinally oriented, oppositely facing groove cam means, said cam assembly further including a track-travelling, cam-follower element attached to said lid means and having inwardly-facing groove-cam-follower members for captivation by said groove cam means of said track effective to maintain said lid means in predetermined spaced association to said shroud means, said track including upstanding spur means for nudging said cam-follower element sharply upwardly effective to provide an initial abrupt rise of said lid means by said unitary optical assembly on said emergence of said screen, such that as said unitary optical assembly is elevated and lowered by said precision elevating means, said lid-raising means is effective to raise and lower said lid means in relatively friction-free sliding association while holding said lid means apart from rubbing contact with said shroud means.

* * * * *